(12) United States Patent
Kim et al.

(10) Patent No.: US 11,678,073 B2
(45) Date of Patent: Jun. 13, 2023

(54) ELECTRONIC SYSTEM AND IMAGE SYSTEM FOR MEASURING PARTICULATE MATTER AND METHOD FOR MEASURING PARTICULATE MATTER

(71) Applicant: SAMSUNG ELECTRONICS CO., LTD., Suwon-si (KR)

(72) Inventors: Joonggyu Kim, Suwon-si (KR); Minhyuk Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 16/901,488

(22) Filed: Jun. 15, 2020

(65) Prior Publication Data

US 2021/0120195 A1  Apr. 22, 2021

(30) Foreign Application Priority Data

Oct. 18, 2019 (KR) .................. 10-2019-0129958

(51) Int. Cl.
*H04N 5/52* (2006.01)
*H04N 25/40* (2023.01)
*H04N 23/81* (2023.01)
*G01N 21/88* (2006.01)

(52) U.S. Cl.
CPC .............. *H04N 25/40* (2023.01); *H04N 5/52* (2013.01); *H04N 23/811* (2023.01); *G01N 21/88* (2013.01)

(58) Field of Classification Search
CPC ........ H04N 5/341; H04N 5/2171; H04N 5/52; G01N 21/88; G01N 21/53; G01N 21/8507; G01N 21/85; G01N 2021/8578; G01N 15/0205; G01N 15/1434; G01N 2015/1486
See application file for complete search history.

(56) References Cited

U.S. PATENT DOCUMENTS

| 5,838,007 A | * | 11/1998 | Wang ...................... G01N 21/41 250/338.5 |
| 8,654,217 B2 | | 2/2014 | Farid |
| 9,270,984 B2 | | 2/2016 | Huang |
| 9,677,986 B1 | | 6/2017 | Baldwin et al. |
| 2017/0223337 A1 | * | 8/2017 | Sung .................... H04N 13/296 |

FOREIGN PATENT DOCUMENTS

| JP | 2010-081339 A | 4/2010 |
| KR | 10-2010-0099563 A | 9/2010 |
| KR | 10-2017-0042076 A | 4/2017 |
| KR | 10-1932483 B1 | 12/2018 |

* cited by examiner

*Primary Examiner* — Yogesh K Aggarwal
(74) *Attorney, Agent, or Firm* — Sughrue Mion, PLLC

(57) ABSTRACT

Provided are an electronic system, an image system, and a method for measuring particulate matter. The electronic system includes an illuminator, a sensor and a processor. The illuminator outputs light. The sensor includes a pixel array to generate an analog signal based on scattered light according to the output light, and a converting circuit to convert the analog signal into digital signals respectively corresponding to gain values, based on the gain values. The processor counts the number of values greater than or equal to a threshold value among values of the digital signals, and calculates a concentration of particulate matter having a target size range, based on a variation in the counted number according to a change of the gain values.

20 Claims, 13 Drawing Sheets

ELECTRONIC SYSTEM AND IMAGE SYSTEM FOR MEASURING PARTICULATE MATTER AND METHOD FOR MEASURING PARTICULATE MATTER

CROSS-REFERENCE TO RELATED APPLICATION

This U.S. non-provisional patent application claims priority under 35 U.S.C. § 119 from Korean Patent Application No. 10-2019-0129958, filed on Oct. 18, 2019, the entire disclosure of which is hereby incorporated by reference.

BACKGROUND

Embodiments of the inventive concept relate to a semiconductor device and system including a light sensor, and more particularly, relate to an electronic system and an image system for measuring particulate matter, and a method for measuring the particulate matter.

A light sensor is provided in various electronic devices including a smart phone. The light sensor may be used to capture an external image by converting external light into an electrical signal. The light sensor may be implemented to perform various functions such as calculating a distance of an object, recognizing an object, etc., using a sensed image as well as a function of capturing to simply display the external image.

Due to the evolution of industrial technology, a combustion of a fossil fuel or a discharge of gas by factories, automobiles, etc., is proceeding remarkably. As a result, particulate matter (PM) is generated and floats in the atmosphere. Such particulate matter may adversely affect the respiratory system, eyes, skin, etc. Accordingly, interest in the particulate matter is increasing, and a desire to know a current concentration of the particulate matter is increasing. In addition, there is a need for a solution in which individual people may measure the particulate matter through the above-described light sensor.

SUMMARY

Aspects of one or more exemplary embodiments provide an electronic system and an image system for measuring a concentration of particulate matter for each of plural sizes, and a method for measuring the particulate matter.

According to an aspect of an exemplary embodiment, there is provided an electronic system including: an illuminator configured to output light; a sensor including a pixel array configured to generate an analog signal based on scattered light according to the output light, and a converting circuit configured to convert the analog signal into digital signals respectively corresponding to gain values, based on the gain values; and a processor configured to determine a number of values greater than or equal to a threshold value among values of the digital signals, and to determine a concentration of particulate matter having a target size range, based on a variation in the determined number according to a change of the gain values.

According to an aspect of another exemplary embodiment, there is provided an image system including: a pixel array including: first pixels configured to generate a first analog signal based on scattered light corresponding to light of a first wavelength band output from a light source, and second pixels configured to generate a second analog signal based on light of a second wavelength band less than the first wavelength band; a converting circuit configured to convert the first analog signal into first digital signals respectively corresponding to gain values, and to convert the second analog signal into a second digital signal; and a processor configured to determine a concentration of particulate matter in a region where the light is output, based on a number of values, of each of the first digital signals, greater than or equal to a threshold value and a variation of the number.

According to an aspect of another exemplary embodiment, there is provided a method for measuring particulate matter, the method including: generating an analog signal by sensing scattered light according to an output of light; converting the analog signal into digital signals respectively corresponding to gain values, based on the gain values; determining a number of values greater than or equal to a threshold value among values of the digital signals; and determining a concentration of particulate matter corresponding to at least one target size range, based on the determined number.

According to an aspect of another exemplary embodiment, there is provided an electronic device including: a memory storing instructions; and at least one processor configured to execute the instructions to: determine a number of values greater than or equal to a threshold value among values of digital signals respectively corresponding to gain values used to convert an analog signal to the digital signals, the analog signal corresponding to scattered light incident on a pixel array, and determine a concentration of particulate matter having a predetermined size range, based on a variation in the determined number according to a change of the gain values.

BRIEF DESCRIPTION OF THE FIGURES

The above and other objects and features will become apparent by describing in detail exemplary embodiments with reference to the accompanying drawings, in which.

DETAILED DESCRIPTION

Hereinafter, exemplary embodiments of the inventive concept(s) will be described clearly and in detail such that those skilled in the art may easily carry out the inventive concept(s).

It is understood that, as used herein, expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

Figure 1:
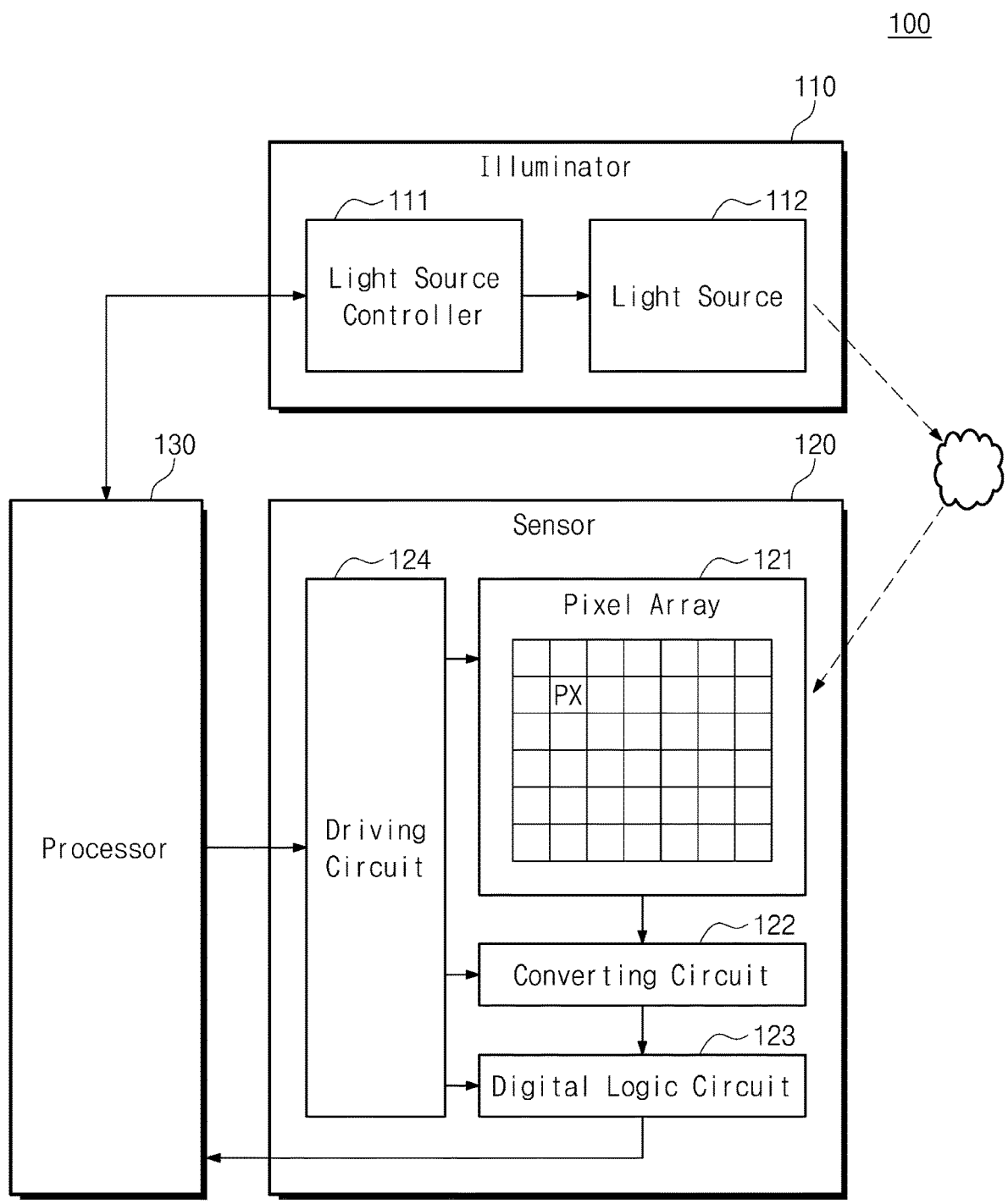
FIG. 1 is a block diagram illustrating an electronic system or an image system according to an exemplary embodiment.

FIG. 1 is a block diagram illustrating an electronic system or an image system 100 according to an exemplary embodiment. Referring to FIG. 1, an electronic system or imaging system (hereinafter, a system 100) includes an illuminator 110, a sensor 120, and a processor 130 (e.g., at least one processor). The system 100 may measure particulate matter. The system 100 may be implemented in various electronic devices such as a digital camera, a smart phone, a tablet personal computer (PC), a wearable device, etc. The system 100 may be implemented as an integrated circuit (IC) or a system on chip (SoC). It is understood, however, that one or more other exemplary embodiments are not limited thereto, and the system 100 may be implemented as any device or circuit for measuring the particulate matter. For example, the system 100 may be implemented as a dedicated electronic device for measuring the particulate matter.

The illuminator 110 is configured to output light to an outside. The illuminator 110 may output light of a band that is not sensed by a user, such as an infrared band, to the outside. It is understood, however, that one or more other exemplary embodiments are not limited thereto, and the illuminator 110 may output light of band different than the infrared band to the outside. The illuminator 110 may include a light source controller 111 and a light source 112.

The light source controller 111 may control an operation of the light source 112. The light source controller 111 may control a timing of the light output from the illuminator 110. For example, the light source controller 111 may control an output timing of the light, based on a clock that is toggled during a time of outputting the light. Such a clock may be generated from or based on the sensor 120 or the processor 130.

The light source 112 may output the light to the outside under a control of the light source controller 111. The light source 112 may include a light emitting device that generates the light, based on an electrical signal received from the light source controller 111. The light source 112 may output the light in the infrared band, but is not limited thereto as discussed above. The type of the light source 112 is not limited and, for example, the light source 112 may be implemented with a vertical cavity surface emitting laser (VCSEL).

The light output from the light source 112 is scattered by the particulate matter. Here, the particulate matter may be defined as particulate matter of solid or liquid suspended in the air. The particulate matter may be classified depending on a diameter. For example, the diameter of the particulate matter defined by PM 10 may be 10 µm or less, and the diameter of a fine particulate matter defined by PM 2.5 may be 2.5 µm or less. When the light is irradiated onto particles having the same physical properties, the amount of scattered light is proportional to a mass concentration. That is, as the diameter of the particulate matter increases, the mass concentration of the particulate matter increases, and the amount of scattered light increases. By sensing an intensity of this scattered light, the concentration of the particulate matter in a specific size range may be calculated or determined. Here, the specific size range may include various diameter ranges, which includes the PM 10 and the PM 2.5.

The sensor 120 senses the light scattered by the particulate matter. The sensor 120 may generate an analog signal, which is an electrical signal, based on the scattered light, and convert the analog signal into a digital signal. The sensor 120 may include a pixel array 121, a converting circuit 122, a digital logic circuit 123, and a driving circuit 124.

The pixel array 121 includes a plurality of pixels PX arranged two-dimensionally. Each of the plurality of pixels PX may generate the analog signal, based on the light received from the outside. The pixel array 121 may be controlled by driving signals provided from the driving circuit 124 to generate the analog signal. The analog signal may be provided to the converting circuit 122 through a plurality of column lines.

At least some of the plurality of pixels PX may sense the scattered light. When the light source 112 outputs the light in the infrared band, the scattered light may be light in the infrared band. At least some of the plurality of pixels PX may generate the analog signal, based on the light in the infrared band. For example, when the system 100 is the dedicated device for measuring the particulate matter, all the pixels PX included in the pixel array 121 may sense the light in the infrared band. By way of another example, when the system 100 is a device for image capturing (e.g., a digital camera or a mobile phone), some of the plurality of pixels PX may sense the light in the infrared band, and the others may sense light in the visible light band. Details of the pixel array 121 will be described later.

The converting circuit 122 may convert the analog signal into the digital signal. The converting circuit 122 may perform various operations for converting the analog signal into the digital signal in response to a control signal of the driving circuit 124. In an example, the converting circuit 122 may perform a correlated double sampling (CDS) or a pseudo-CDS to extract valid signal components.

The converting circuit 122 may convert the analog signal into digital signals respectively corresponding to gain values, based on various gain values. The converting circuit 122 may amplify the analog signal, based on the gain values. Information about the gain values may be provided from the processor 130, and the driving circuit 124 may control a gain value of the converting circuit 122, based on the information. To calculate the concentration according to a size range of the particulate matter, the converting circuit 122 may convert the analog signal into the digital signal while increasing the gain value.

For example, the analog signal due to the light scattered from the PM 10 may be greater than or equal to a threshold value when (e.g., based on being) converted by a first gain value. In this case, the analog signal due to the light scattered from the PM 2.5 may be greater than or equal to the threshold value when (e.g., based on being) converted by a second gain value greater than the first gain value. Here, the threshold value may be defined as an electrical level at which a specific pixel may be considered saturated. Through this, the particulate matter and the fine particulate matter may be distinguished, and the concentration according to the size range of the particulate matter may be calculated. Details of the converting circuit 122 are described below.

The digital logic circuit 123 may temporarily store digital signals and output the stored digital signals to the processor 130. The digital logic circuit 123 may sequentially latch the digital signals and output the latched digital signals under a control of the driving circuit 124.

The driving circuit 124 may control the pixel array 121, the converting circuit 122, and the digital logic circuit 123. For example, the driving circuit 124 may generate a clock signal and a timing control signal for an operation of the pixel array 121, the converting circuit 122, and the digital logic circuit 123. The clock signal may be provided to the light source controller 111. In an example, the driving circuit 124 may include at least one of a logic control circuit, a phase lock loop (PLL) circuit, a timing control circuit, a communication interface circuit, etc.

The driving circuit 124 may select one or more rows of the plurality of rows in the pixel array 121. The analog signal that is generated from the pixels PX of the selected row may be transferred to the converting circuit 122. The driving circuit 124 may control the pixel array 121 such that the pixel array 121 repeatedly senses the scattered light. The driving circuit 124 may control the pixel array 121 to generate image signals corresponding to each of the gain values. Here, the image signals are included in the analog signal.

The driving circuit 124 may control the pixel array 121 to generate a plurality of frame signals at one (e.g., each) gain value. Here, the frame signals are included in the image signal. That is, the pixel array 121 may generate the plurality of frame signals for each gain value and output the plurality of frame signals to the converting circuit 122. The plurality of frame signals may be digitally converted and averaged or binned by the converting circuit 122 or the digital logic circuit 123. This is to improve a calculation accuracy of the concentration of the particulate matter. It is understood, however, that one or more other exemplary embodiments are not limited thereto, and an averaging or a binning may be performed by the processor 130.

The processor 130 may perform a control operation for controlling the system 100 and a calculation operation for calculating various data. The processor 130 may control the illuminator 110 to output the light. The processor 130 may allow or control the sensor 120 to generate the digital signal by sensing the scattered light.

The processor 130 may calculate or determine the concentration of the particulate matter according to the size range of the particulate matter, based on the digital signal. The digital signal may include values corresponding to each of the plurality of pixels PX. The processor 130 may count the number of values above the threshold value among these values. A pixel corresponding to a value greater than or equal to the threshold value may be regarded as saturated by the scattered light. In this case, the count value may be understood as the number of saturated pixels at a specific gain value. The processor 130 may receive digital signals respectively corresponding to the gain values, and count the number of values greater than or equal to the threshold value for each of the digital signals. When the number of gain values is sixteen, sixteen count values may be generated.

The processor 130 may calculate a variation of count values respectively corresponding to the gain values. Here, the variation may be understood as a change in the number of saturated pixels with respect to the gain values, and may be represented as a differential value. For example, when the gain values are 1 to 16, first to sixteenth count values respectively corresponding to the gain values 1 to 16 may be calculated or determined. The processor 130 may calculate the differential value corresponding to a second gain value by subtracting a first count value from a second count value. The processor 130 may calculate the differential value corresponding to a third gain value by subtracting the second count value from a third count value. This differential value or the variation may indicate the intensity or amount of the scattered light in a specific range. Accordingly, the differential value or the variation may be related to the size of the particulate matter scattering the light.

The processor 130 may generate (or determine or obtain) particulate matter data corresponding to the specific size range by applying a correction factor to the calculated differential values. The correction factor may be determined based on the size range of the particulate matter to be calculated. The size range of the particulate matter may be provided in plural, such as the PM 2.5 and the PM 10. For example, the particulate matter data may include particulate matter data corresponding to the PM 2.5 and particulate matter data corresponding to the PM 10. The particulate matter data may be converted based on a unit volume (e.g., 1 m$^3$) and used to calculate the concentration of the particulate matter for each size range.

Unlike the above description, at least a part of a counting operation, a variation calculation operation, and a calculation operation of the correction factor performed by the processor 130 may be performed by the digital logic circuit 123. In this case, the digital logic circuit 123 may count values greater than or equal to the threshold value in the digital signals generated through the converting circuit 122.

The processor 130 may determine an operation mode of the system 100. For example, the pixel array 121 may include first pixels that sense the infrared band and second pixels that sense the visible light band. In the operation mode for measuring the particulate matter, the processor 130 may activate the illuminator 110 and control the sensor 120 such that the first pixels sense the scattered light (i.e., to detect or measure particulate matter). In the operation mode for a normal image capture, the processor 130 may deactivate the illuminator 110 and control the sensor 120 such that the second pixels sense the light in the visible light band (i.e., to capture an image).

Figure 2:
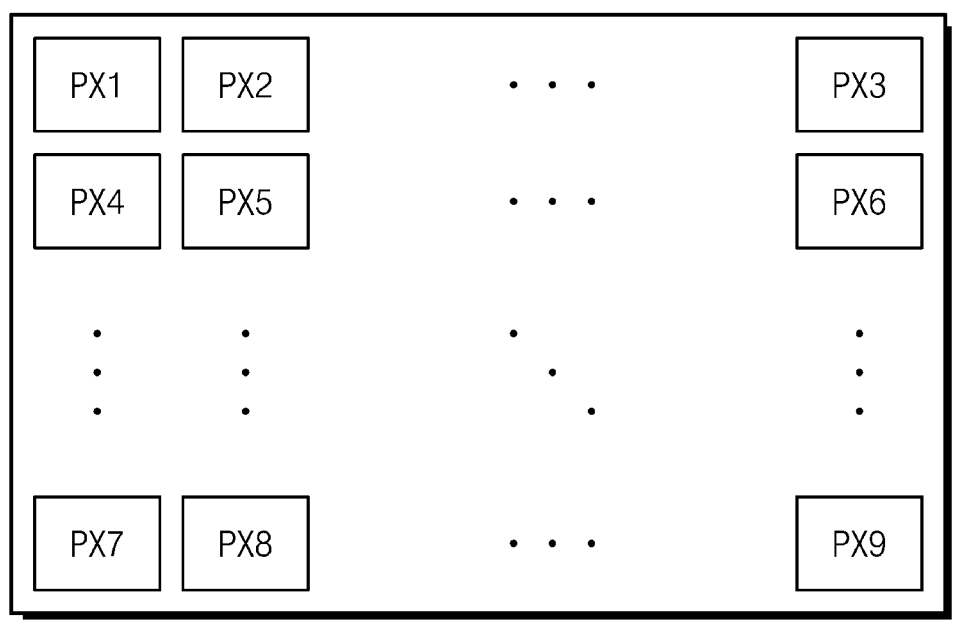
FIG. 2 is an diagram illustrating a pixel array according to an exemplary embodiment.

FIG. 2 is a diagram illustrating a pixel array 121_1 according to an exemplary embodiment. The pixel array 121_1 illustrated in FIG. 2 may correspond to the pixel array 121 of FIG. 1. Referring to FIG. 2, the pixel array 121_1 includes a plurality of pixels PX1 to PX9. The plurality of pixels PX1 to PX9 are two-dimensionally arranged.

In the exemplary embodiment of FIG. 2, all of the pixels PX1 to PX9 may sense the scattered light according to the light output from the illuminator 110 of FIG. 1. That is, all of the pixels PX1 to PX9 may sense the light in, by way of example, the infrared band. In this case, the system 100 of FIG. 1 including the pixel array 121_1 of FIG. 2 may be implemented as the dedicated device for measuring the particulate matter, though this is just an example and one or more other exemplary embodiments are not limited thereto. For example, the system 100 may be implemented to further perform an additional operation that may be performed by sensing the light in the infrared band, such as a depth measurement, in addition to the operation for measuring the particulate matter.

Figure 3:
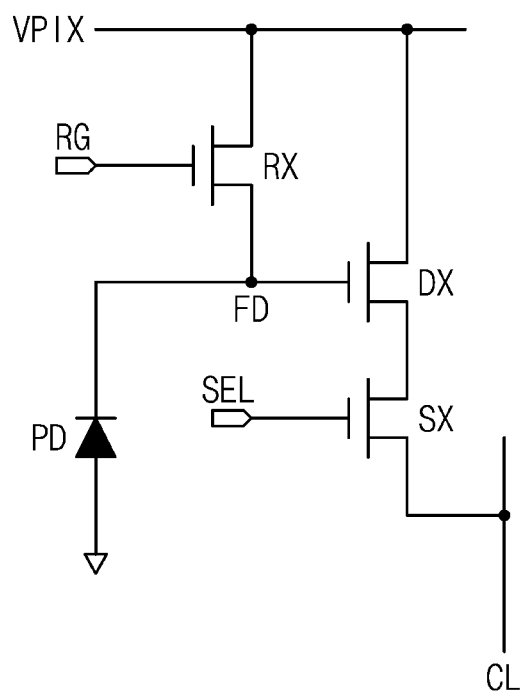
FIG. 3 is a circuit diagram illustrating a pixel according to an exemplary embodiment.

FIG. 3 is a circuit diagram illustrating a pixel PX according to an exemplary embodiment. The pixel PX may correspond to the pixel PX of FIG. 1 or one of the pixels PX1 to PX9 of FIG. 2. Referring to FIG. 3, the pixel PX may include a photoelectric conversion element PD, a reset transistor RX, a selection transistor SX, and a driving transistor DX. It is understood that the circuit structure of FIG. 3 is exemplary and the pixel structure of FIGS. 1 and 2 is not limited to FIG. 3. For example, the pixel PX may further include a transfer transistor connected between the photoelectric conversion element PD and the driving transistor DX. Additionally, the pixel PX may further include a conversion gain transistor and a capacitor for configuring a conversion gain variable circuit.

The photoelectric conversion element PD generates and accumulates charges according to at least one of the amount of light incident thereto and the intensity of light. When (or based on) the photoelectric conversion element PD is included in the pixel array 121_1 of FIG. 2, the photoelectric conversion element PD may generate and accumulate the charges, based on the scattered light in the infrared band. For example, the photoelectric conversion element PD may be a photodiode using InGaAs (indium gallium arsenide) sense the light in the infrared band, but is not limited thereto in one or more other exemplary embodiments. For example, the photoelectric conversion element PD may be a photodiode, a phototransistor, a photogate, a pinned photodiode (PPD), or a combination thereof.

The charges generated from the photoelectric conversion element PD are transferred to a floating diffusion region FD. The pixel PX may further include a transfer transistor for controlling a charge transfer. An exposure time of the photoelectric conversion element PD may be controlled by the transfer transistor. For example, instead of amplifying the analog signal, based on the gain value in the converting circuit 122 of FIG. 1, the driving circuit 124 may control the transfer transistor to perform an adjusting operation of the gain value in FIG. 1. Accordingly, the exposure time depending on the gain value may be provided, and the converting circuit 122 may convert the analog signal generated based on the exposure time into the digital signal. In this case, the converting circuit 122 may not generate the digital signals while changing the gain value as illustrated in FIG. 1.

The floating diffusion region FD may accumulate the charges transferred from the photoelectric conversion elements PD. The driving transistor DX may be controlled based on an amount of charges accumulated in the floating diffusion region FD.

The reset transistor RX may reset the charges accumulated in the floating diffusion region FD. A drain terminal of the reset transistor RX may be connected to the floating diffusion region FD, and a source terminal of the reset transistor RX may be connected to a pixel power supply voltage VPIX. The reset transistor RX may be turned on or off based on a reset signal RG. The reset signal RG may be provided from the driving circuit 124 of FIG. 1. When the reset transistor RX is turned on, the pixel power supply voltage VPIX may be transferred to the floating diffusion region FD. In this case, the charges accumulated in the floating diffusion region FD may be discharged, and the floating diffusion region FD may be reset.

The driving transistor DX may be a source follower buffer amplifier that generates a source-drain current in proportion to the amount of the charges in the floating diffusion region FD input to a gate electrode. The driving transistor DX may amplify a potential change in the floating diffusion region FD and output the amplified signal through the selection transistor SX to a column line CL.

The selection transistor SX is used to select the pixel PX to be read in unit of row. The selection transistor SX may be turned on or turned off based on a selection signal SEL. The selection signal SEL may be provided from the driving circuit 124 of FIG. 1. When the selection transistor SX is turned on by the selection signal SEL, the analog signal output from the driving transistor DX may be output to the column line CL.

Figure 4:
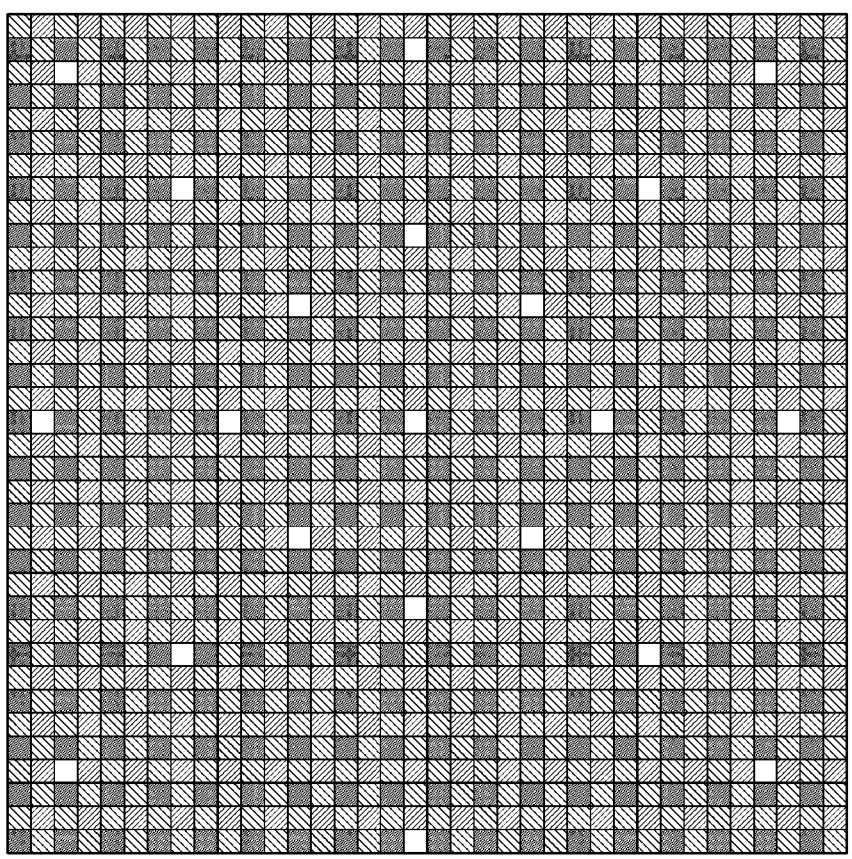
FIG. 4 is a diagram illustrating a pixel array according to an exemplary embodiment.
Figure 4:
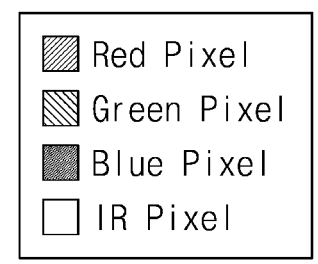
Figure 4:
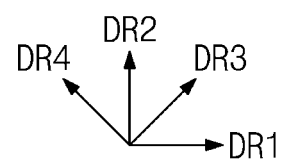

FIG. 4 is a diagram illustrating a pixel array 121_2 according to an exemplary embodiment. The pixel array 121_2 may correspond to the pixel array 121 of FIG. 1. Referring to FIG. 4, the pixel array 121_2 includes a plurality of pixels. The plurality of pixels are two-dimensionally arranged on a plane that is defined by a first direction DR1 and a second direction DR2.

In the exemplary embodiment of FIG. 4, the pixel array 121_2 may include first pixels that sense light in a first band (e.g., the infrared (IR) band) and second pixels (color pixels) that sense light in a second band (e.g., the visible light band). For example, the second pixels may include red pixels corresponding to a red color, green pixels corresponding to a green color, and blue pixels corresponding to a blue color. In this case, the system 100 of FIG. 1 including the pixel array 121_2 of FIG. 4 may selectively perform an operation for measuring the particulate matter and a normal image capturing operation.

The first pixels (IR pixels) may sense the scattered light according to the light output from the illuminator 110 of FIG. 1. The first pixels may generate the analog signal, based on the scattered light. The analog signal may be used to measure the particulate matter, as described in FIG. 1.

The second pixels (color pixels) may generate the analog signal by sensing the light in the visible light band in the normal image capturing operation. The converting circuit 122 of FIG. 1 may generate a digital image signal, based on the analog signal. In this case, the image signal corresponding to the first pixels may be corrected by a pixel correction operation, etc.

To minimize a deterioration of the image and a lens shading that are generated in the normal image capturing operation, the number of first pixels may be limited. For example, the number of first pixels may be less than the number of second pixels. In the present exemplary embodiment, as illustrated in FIG. 4, the first pixels may be arranged in a particular manner. For example, the first pixels may be arranged such that at least four second pixels are disposed between two of the first pixels. Other first pixels may be disposed with at least four second pixels therebetween in a first direction DR1, a second direction DR2, a third direction DR3, and a fourth direction DR4, with respect to the first pixel located at a center of the illustrated pixel array 121_2.

Figure 5:
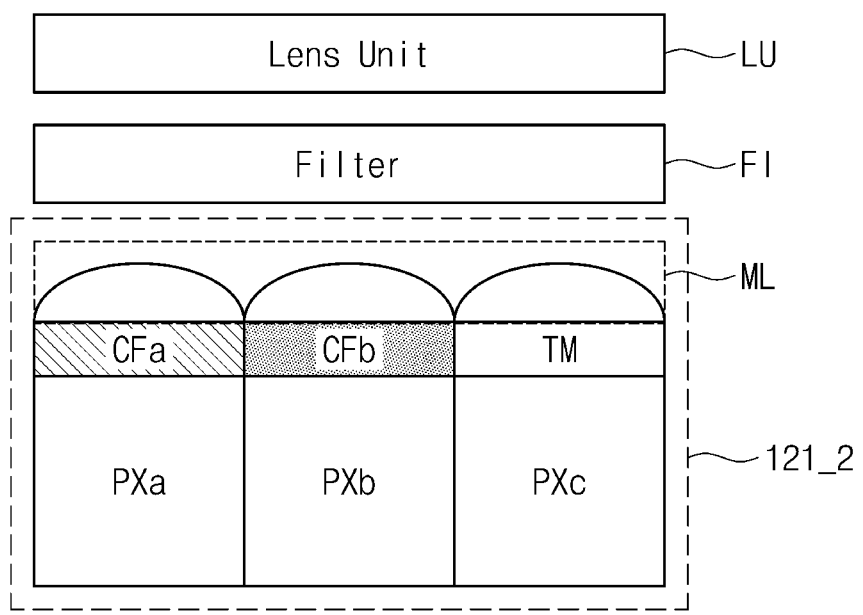
FIG. 5 is a cross-sectional diagram illustrating a pixel array according to an exemplary embodiment.

FIG. 5 is a cross-sectional diagram illustrating a pixel array 121_2 according to an exemplary embodiment. The pixel array 121_2 of FIG. 5 may correspond to the pixel array 121_2 of FIG. 4. FIG. 5 illustrates three pixels of the pixel array 121_2. Referring to FIG. 5, the pixel array 121_2 may include a first pixel region PXa, a second pixel region PXb, a third pixel region PXc, a first color filter CFa, a second color filter CFb, a transparent member TM, and a micro lens ML.

The first pixel region PXa and the second pixel region PXb may generate charges, based on the light in the visible light band. For example, the first pixel region PXa and the second pixel region PXb may include a photodiode for generating the charges, such as a Si photo diode.

The first color filter CFa is disposed on the first pixel region PXa. The first color filter CFa may pass light of a first color (e.g., green) band. The second color filter CFb is disposed on the second pixel region PXb. The second color filter CFb may pass light of a second color (e.g., blue) band different from the first color filter CFa. As a result, the first pixel region PXa may generate the charges based on the light corresponding to the first color, and the second pixel region PXb may generate the charges based on the light corresponding to the second color.

The third pixel region PXc may generate charges based on the light in the infrared band. For example, the third pixel region PXc may include a photodiode for generating the charges. In this case, to sense the light in the infrared band, the third pixel region PXc may include, by way of example, the InGaAs photodiode, although one or more other exemplary embodiments are not limited thereto as described above. To sense the light in a wavelength band different from the first pixel region PXa and the second pixel region PXb, at least a part of a material included in the third pixel region PXc may be different from a material of the first pixel region PXa and the second pixel region PXb. Alternatively, to sense light in different wavelength bands, a doping concentration of at least a portion of the third pixel region PXc may be different from a doping concentration of the first pixel region PXa and the second pixel region PXb.

The transparent member TM may be disposed on a third pixel area PXc. Since the third pixel area PXc senses the light in the infrared band, a separate color filter is not required on the third pixel area PXc. However, to compensate for a height according to an arrangement of the first color filter CFa and the second color filter CFb, the transparent member TM may be disposed on the third pixel area PXc. The transparent member TM may pass the light in the infrared and visible light bands.

The micro lens ML is disposed on the first color filter CFa, the second color filter CFb, and the transparent member TM. The micro lens ML may focus the light entering the first to third pixel areas PXa, PXb, and PXc, thereby increasing a light sensing effect.

The filter FI may be disposed on the pixel array 121_2. The filter FI may pass light in a wavelength band in which sensing is performed or required. Here, the wavelength band in which the sensing is performed or required may include at least a portion of the visible light band (e.g., the first wavelength band) to be sensed by the first pixel region PXa and the second pixel region PXb, and at least a portion of the infrared band (e.g., the second wavelength band) to be sensed by the third pixel region PXc. As an example, the filter FI may filter the light of the third wavelength band between the first wavelength band and the second wavelength band. The third wavelength band may, by way of example, be 700 nm to 1000 nm.

The lens unit LU may refract the light incident to the pixel array 121_2 and transfer the light to the pixel array 121_2. The scattered light due to the particulate matter or the light in the visible light band for image capturing may be transferred to the pixel array 121_2 through the lens unit LU and the filter FI.

Figure 6:
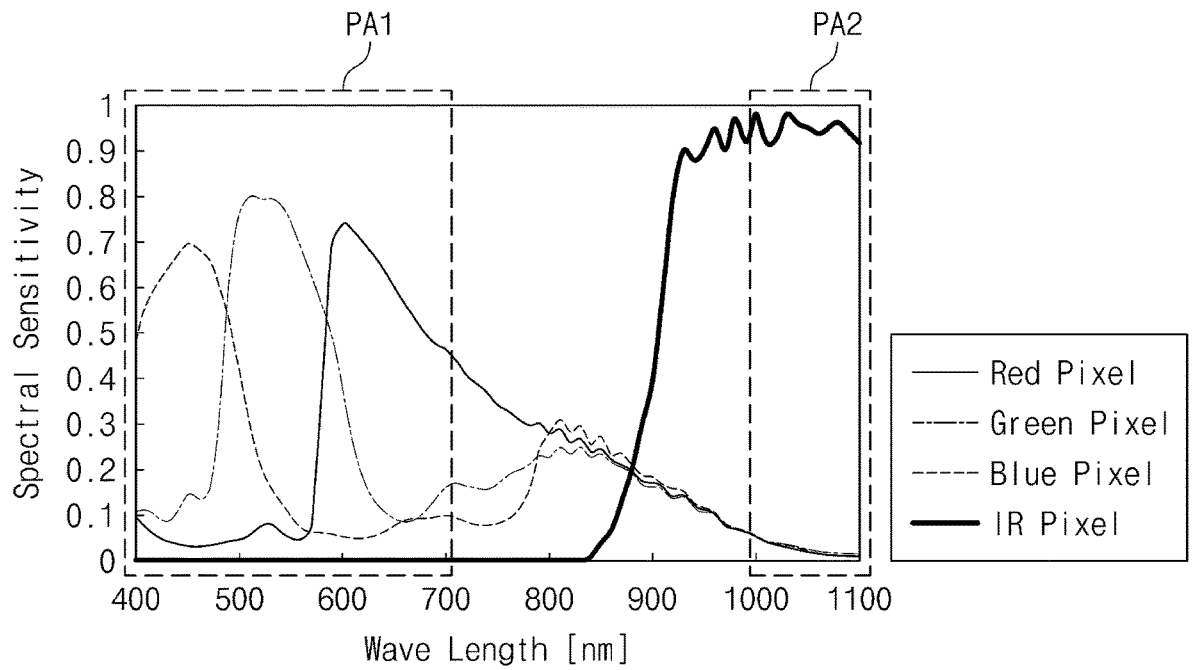
FIG. 6 is a graph describing a filter of FIG. 5.

FIG. 6 is a graph describing a filter of FIG. 5. Referring to FIG. 6, a horizontal axis is defined as a wavelength of light, and a vertical axis is defined as an intensity of a response to light of a specific wavelength, that is, a spectral sensitivity. The pixel array 121_2 of FIG. 4 or 5 may include a red color pixel, a green color pixel, a blue color pixel, and an infrared (IR) pixel.

The red color pixel, the green color pixel, and the blue color pixel may have a peak value of the spectral sensitivity in the visible light band between 400 nm and 700 nm. In addition, the infrared pixel may have a peak value of the spectral sensitivity in the infrared band greater than 1000 nm. The filter FI of FIG. 5 may pass the light in a first wavelength band PA1 corresponding to the visible light band less than 700 nm and a second wavelength band PA2 corresponding to the infrared band greater than 1000 nm.

The filter FI of FIG. 5 may filter light in a wavelength band between 700 nm and 1000 nm. The red color pixel, the green color pixel, the blue color pixel, and the infrared pixel exhibit uniform magnitude of the spectral sensitivity in the wavelength band between 700 nm and 1000 nm. When the light is not blocked in the wavelength band between 700 nm and 1000 nm, the light in that wavelength band is sensed from each pixel. In this case, an accuracy of the image capturing operation or the particulate matter measuring operation may be decreased. That is, the filter FI of FIG. 5 passes the light of the first wavelength band PA1 and the second wavelength band PA2 and blocks the light of the wavelength band therebetween, thereby improving reliability of the image capturing operation and the particulate matter measuring operation.

Figure 7:
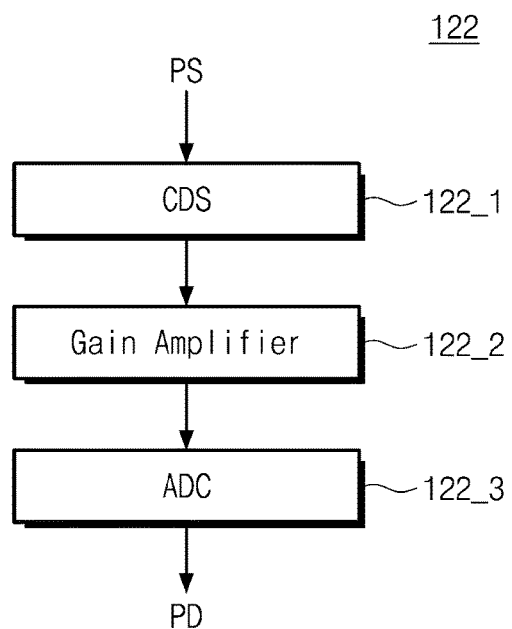
FIG. 7 is a block diagram illustrating a converting circuit according to an exemplary embodiment.

FIG. 7 is a block diagram illustrating a converting circuit 122 according to an exemplary embodiment. The converting circuit 122 of FIG. 7 may correspond to the converting circuit 122 illustrated in FIG. 1. Referring to FIG. 7, the converting circuit 122 may include a correlated double sampler (CDS) 122_1, a gain amplifier 122_2, and an analog-to-digital converter 122_3. The structure of the converting circuit 122 of FIG. 7 will be understood to be an exemplary block diagram for describing functions or operations of the converting circuit separately, for convenience of explanation. By way of example, operations performed in the correlated double sampler (CDS) 122_1, the gain amplifier 122_2, and the analog-to-digital converter 122_3 may be implemented in an integrated circuit, and one integrated circuit may perform a correlated double sampling, a gain amplification, a digital conversion, etc.

The converting circuit 122 may receive an analog signal PS generated based on the scattered light caused by the particulate matter. The analog signal PS may be provided to the correlated double sampler 122_1. For example, the correlated double sampler (CDS) 122_1 may remove a fixed pattern noise (FPN) of the analog signal PS. The correlated double sampler 122_1 may, by way of example, output an analog signal that is sampled based on a difference between the analog signal PS and a reference signal to the gain amplifier 122_2

The gain amplifier 122_2 may amplify the sampled analog signal, based on the gain value. For example, the gain amplifier 122_2 may output a result of multiplying the sampled analog signal by a specified gain value. As described above, to measure the particulate matter, the gain value may increase sequentially. The gain value may increase sequentially from 1 to 16. When ten images (analog signal) for one gain value are generated from the pixel array 121, the ten images may be amplified using the same gain value. Thereafter, the gain value is increased by one, and ten images that are again acquired may be amplified using an increased gain value. The analog signal amplified with different gain values may be used to calculate the concentration according to the size of the particulate matter.

The analog-to-digital converter 122_3 may convert the analog signal that is amplified based on the gain value into a digital signal PD. The analog-to-digital converter 122_3 may sequentially convert the plurality of signals that are amplified based on sequentially increasing gain values into digital signals. These digital signals PD correspond to the gain values, respectively. For example, a gain value may be sequentially increased from 1 to 16, and ten signals (e.g., a frame signal) may be generated from the pixel array 121 for one gain value. In this case, the analog-to-digital converter 122_3 may generate 160 digital signals. It is understood, however, that one or more other exemplary embodiments are not limited thereto. For example, according to another exemplary embodiment, 10 frame signals are averaged or binned before a conversion, and the analog-to-digital converter 122_3 may generate 16 digital signals. One digital signal may have a digital numeric value corresponding to each pixel. This numeric value depends on the intensity of the scattered light received by each of the pixels.

Figure 8:
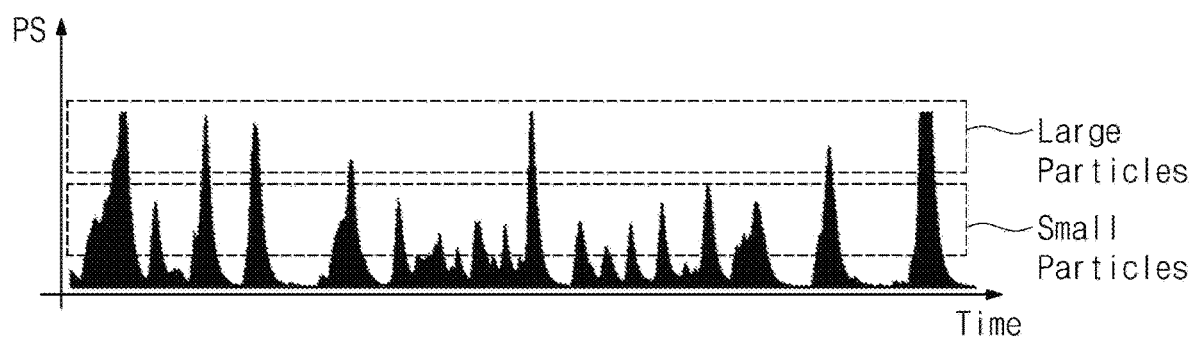
FIG. 8 is a graph describing an analog signal and a gain value described in FIG. 7.

FIG. 8 is a graph describing an analog signal and a gain value described in FIG. 7. Referring to FIG. 8, a horizontal axis is defined as a time, and a vertical axis is defined as a magnitude of the analog signal PS, for example, a voltage level of the analog signal. The analog signal PS may be generated when each of the pixels PX of the pixel array 121 of FIG. 1 senses the scattered light due to the particulate matter. Here, the analog signal PS may be understood as the analog signal corresponding to one pixel PX.

The particulate matter is suspended in the air, and may move continuously over time. Accordingly, the magnitude of the voltage level generated by the pixel PX may continuously change over time. In consideration of this movement, the pixel PX may sense the scattered light several times with respect to one gain value. This number of times (the number of reference scans) is preset and may be, for example, ten times. In this case, the analog signals PS generated according to ten sensing samples or the digital signals generated by the analog signals PS may be averaged or binned. Therefore, the reliability of the particulate matter concentration calculation may be improved.

As described above, the level of the analog signal PS depends on the size of the particulate matter scattering the light. As the size of the particulate matter increases, the amount or intensity of the scattered light increases and the level of the analog signal PS increases. In the graph of FIG. 8, large particles and small particles may be distinguished depending on the magnitude of the peak value. The number of pixels PX generating the analog signal PS depends on the amount of the particulate matter. That is, as the amount of the particulate matter increases, the number of pixels PX that senses the scattered light increases.

The converting circuit 122 of FIG. 1 or the gain amplifier 122_2 of FIG. 7 may amplify the analog signal PS while increasing the gain value. The amplified analog signal PS may be converted into the digital signal, and the number of values greater than or equal to the threshold value may be counted or determined in (or based on, corresponding to, included in, represented by, etc.) the digital signal. The number of counted values depends on the number of pixels that sense the scattered light above a specified intensity. That is, the number of counted values may be related to or indicative of the concentration of the particulate matter above a specified size.

The analog signal PS generated by the large particles may exceed the threshold value even though the analog signal PS is amplified by a small gain value. Meanwhile, the analog signal PS generated by the small particles may exceed the threshold value when amplified by the large gain value. Thus, the variation in the number of counted values as the gain value increases may be related to the amount or concentration of the particulate matter in the specified size range. Based on this concept, the system 100 according to an exemplary embodiment may calculate the size and amount (concentration) of the particulate matter.

Figure 9:
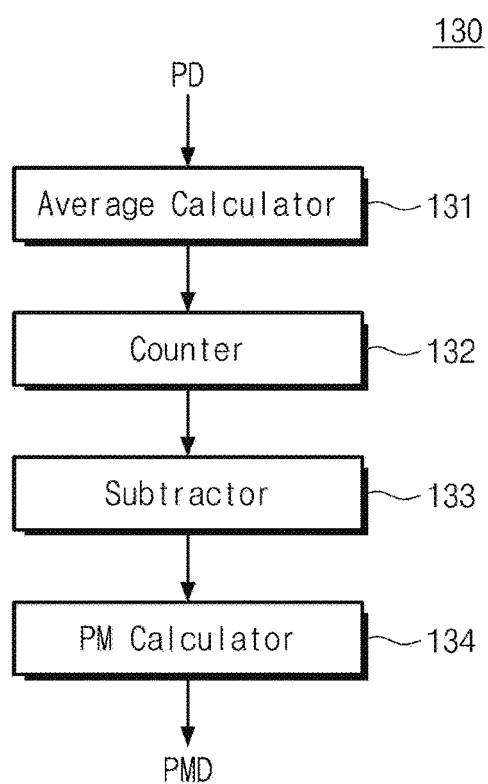
FIG. 9 is a block diagram illustrating a processor according to an exemplary embodiment.

FIG. 9 is a block diagram illustrating a processor 130 according to an exemplary embodiment. The processor 130 of FIG. 9 may correspond to the processor 130 illustrated in FIG. 1. Referring to FIG. 9, the processor 130 may include an average calculator 131, a counter 132, a subtractor 133, and a particulate matter (PM) calculator 134. It is understood that, for convenience of description, the structure of the processor 130 of FIG. 9 is an exemplary block diagram for describing an overall operation of the measurement function of the particulate matter. At least one of the average calculator 131, the counter 132, the subtractor 133, and the particulate matter calculator 134 may be performed in another configuration (e.g., the digital logic circuit 123 of FIG. 1).

The average calculator 131 may perform an average or binning operation on the digital signal PD. As described above with reference to FIG. 8, the pixel array 121 of FIG. 1 may sense the scattered light by a reference scan number with respect to one gain value. Accordingly, the analog signal for measuring the particulate matter may include the image signals corresponding to different gain values, respectively, and each of the image signals may include the analog frame signals by the reference scan number. The converting circuit 122 may convert the analog frame signals generated by the reference scan number into digital frame signals. The average calculator 131 may generate a digital image signal corresponding to one gain value by performing the average operation on the digital frame signals.

Although it is described above that the average calculator 131 performs a digital average or a digital binning while included in the processor 130, it is understood that one or more other exemplary embodiments are not limited thereto. For example, the system 100 according to another exemplary embodiment may perform the average operation on the analog signal. In this case, the average calculator 131 may be disposed, provided, or operated between the pixel array 121 and the converting circuit 122 of FIG. 1 or may be included in the converting circuit 122. Also, as an example, the average calculator 131 may be included in the sensor 120 to calculate the digital average or perform the digital binning. In this case, the average calculator 131 may be included in the converting circuit 122 or the digital logic circuit 123.

In addition, the average calculator 131 may perform the average operation on the count values generated by the counter 132. In this case, the counter 132 may receive the digital signal PD, and the average calculator 131 may perform the average operation on output results of the counter 132.

The counter 132 may count the number of values greater than or equal to the threshold value in the digital signal PD (e.g., the averaged digital signal) corresponding to the gain values, respectively. The digital signal PD (the averaged digital signal) corresponding to one gain value may have numeric values respectively corresponding to the plurality of pixels. Each of the numeric values may be related to a result of multiplying the gain value by the intensity of scattered light sensed by the corresponding pixel. As the number of the particulate matter scattering light increases, the number of counted values increases. The counter 132 may generate count values corresponding to the gain values, respectively. Details thereof are described below with reference to FIG. 10.

The subtractor 133 may calculate the variation of the count value with respect to the gain value. In an example, the subtractor 133 may generate a subtracted value (differential value or variation) for the specific gain value by subtracting the count value for the previous gain value from the count value for the specific gain value. For example, when the specific gain value is 3, the previous gain value may be 2. The subtracted value may be related to the number of the particulate matter in the specific size range. Details thereof are described below with reference to FIG. 11.

The particulate matter calculator 134 may generate (or determine) the particulate matter data PMD, based on the subtracted value. The particulate matter calculator 134 may generate the particulate matter data PMD having a value related to the amount of the particulate matter in the target size range(s) (e.g., PM 10 and PM 2.5). To this end, the particulate matter calculator 134 may apply the correction factor corresponding to the target size range to the subtracted values. For example, the particulate matter calculator 134 may multiply the subtracted values by the correction factor corresponding to the PM 10. This correction factor may be different for each gain value. The value of the corrected data may be related to the amount or number of the particulate matter in the target size range (e.g., predetermined size rage). The particulate matter calculator 134 is described in detail below with reference to FIG. 12.

The particulate matter calculator 134 may generate the particulate matter data PMD by converting data corrected by the correction factor into the unit volume (e.g., 1 m$^3$). As the light is output by the illuminator 110 of FIG. 1, the volume of the scattered region is different from the unit volume. The particulate matter calculator 134 may multiply the corrected data for a ratio of the unit volume of the volume of this region. Accordingly, the particulate matter calculator 134 may calculate the concentration of the particulate matter for each of the target size range.

Figure 10:
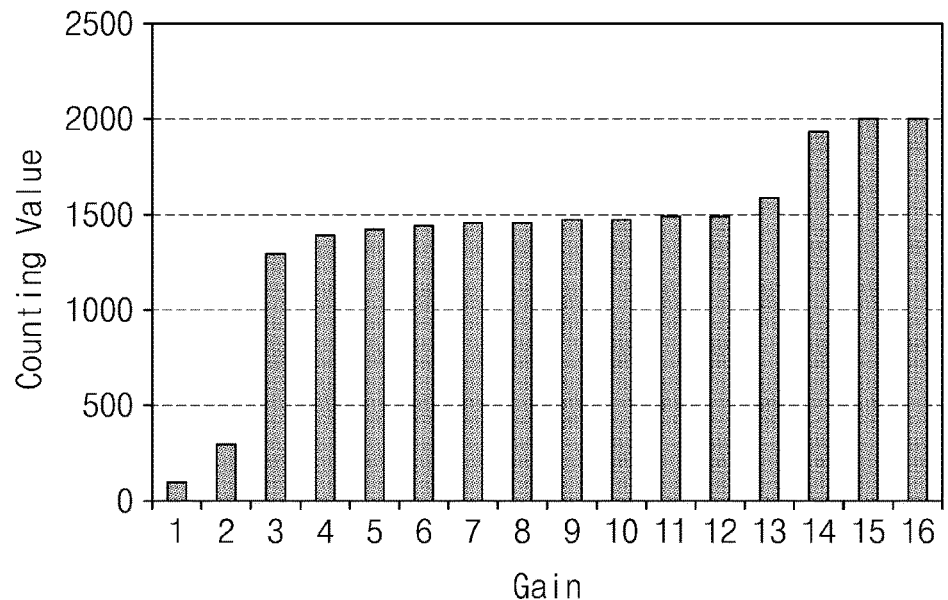
FIG. 10 is a graph describing an operation of a counter of FIG. 9.

FIG. 10 is a graph describing an operation of a counter 132 of FIG. 9. Referring to FIG. 10, a horizontal axis is defined as the gain value and a vertical axis is defined as the count value. In this example, the gain values are illustrated as 1 to 16.

As described above, the sensor 120 of FIG. 1 may sense the scattered light due to the particulate matter, and may then generate the digital signals corresponding to the gain values, respectively. Each of these digital signals may have the numeric values respectively corresponding to the pixels that sense the scattered light. As a gain increases, the magnitude of the numeric values may increase. The counter 132 of FIG. 9 may generate the count value by counting or determining the number of the numeric values greater than or equal to the threshold value.

Referring to FIG. 10, as the gain value increases, the count value may increase. This is because as the gain value increases, the amplification gain of the analog signal increases to increase the numeric value. The count value depends on the number of pixels that sense the scattered light and is related to the number of the particulate matter. It will be understood that as the count value increases, the amount or number of the sensed particulate matter may increase.

Figure 11:
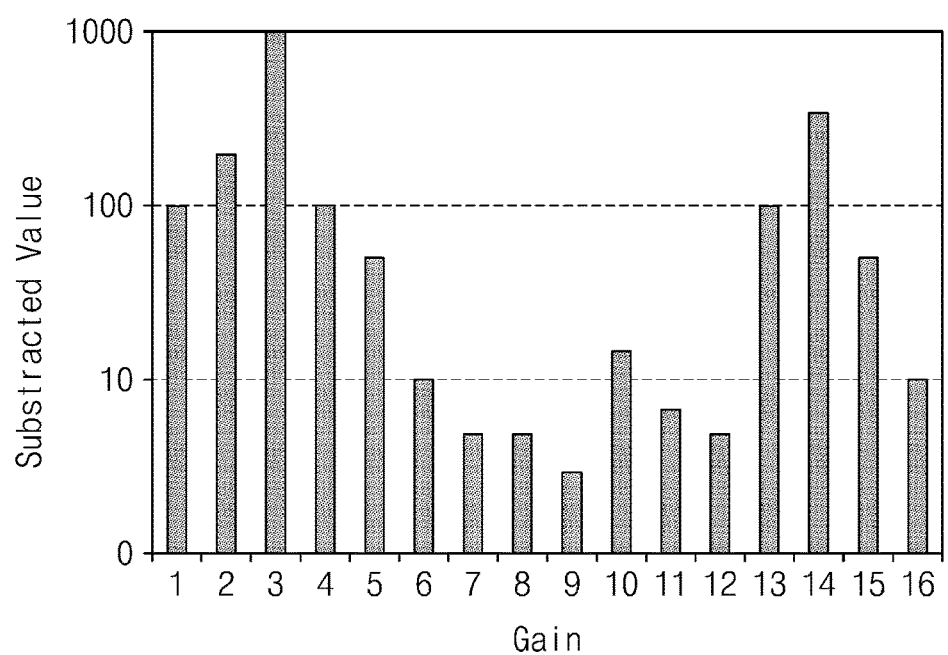
FIG. 11 is a graph describing an operation of a subtractor of FIG. 9.

FIG. 11 is a graph describing an operation of a subtractor 133 of FIG. 9. Referring to FIG. 11, a horizontal axis is defined as the gain value and a vertical axis is defined as the subtracted value. For example, the gain values are illustrated as 1 to 16.

As described above, the subtractor 133 of FIG. 9 may generate the subtracted value for the specific gain value by subtracting the count value for the previous gain value from the count value for the specific gain value. For example, a first subtracted value may be the same as the first count value of FIG. 10. A second subtracted value may be the same as the value obtained by subtracting the first count value from the second count value of FIG. 10. That is, the subtracted value may be understood as the variation or the differential value of the count value with respect to the gain value.

When the subtracted value is large, this may indicate that the number of particulate matter of the specific size is large. The subtracted value for the specific gain may be the number of the pixels that generate the analog signal at the voltage level of the specific range. The voltage level of the specific range may be a result of receiving the scattered light due to the particulate matter of the specific size range. That is, the magnitude of the subtracted value may represent the number of the particulate matter in the specific size range. As the the gain value becomes larger, pixels that generate a smaller voltage level may also be counted. Therefore, as the gain value corresponding to the subtracted value is greater, it may represent the amount of the particulate matter in a smaller size range. Accordingly, the concentration of the particulate matter in a desired size range may be calculated.

Figure 12:
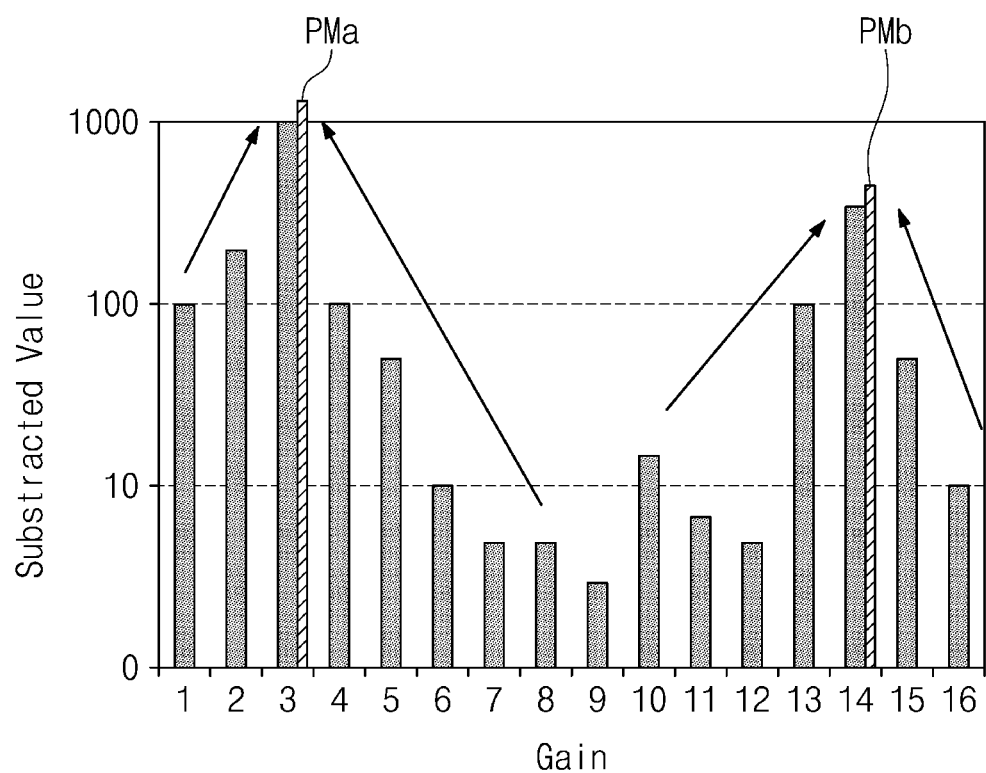
FIG. 12 is a graph describing an operation of a particulate matter calculator of FIG. 9.

FIG. 12 is a graph describing an operation of a particulate matter calculator 123_4 of FIG. 9. Referring to FIG. 12, a horizontal axis is defined as the gain value, and a vertical axis is defined as the subtracted value.

As described above, the particulate matter calculator 123_4 of FIG. 9 may calculate at least one of the number, the amount, and the concentration of the particulate matter in a desired size range by applying the correction factor to the subtracted value. For example, a first particulate matter data PMa related to the number of the particulate matter having a diameter of 10 μm and a second particulate matter data PMb related to the number of the particulate matter having a diameter of 2.5 μm may be calculated. The first particulate matter data PMa may be generated by multiplying the first correction factor to the subtracted values, respectively. The second particulate matter data PMb may be generated by multiplying the second correction factor to the subtracted values, respectively. For example, each of the first correction factor and the second correction factor may include different factor values corresponding to the gain values, respectively.

In general, the size of the subtracted value depends on the number of the particulate matter in the specific size range. However, depending on a distance between the particulate matter and the pixel, a degree of adsorption to the system 100 according to the size of the particulate matter, a type of the particulate matter, a material of the particulate matter, a shape of the particulate matter, etc., an error may occur in a relationship between the subtracted value and the number of the particulate matter in the specific size range. In view of these various factors, the correction factor may be set to improve the reliability for the concentration calculation of the particulate matter. In addition, the particulate matter calculator 123_4 may convert the first particulate matter data PMa and the second particulate matter data PMb into a standard unit of the particulate matter concentration.

Figure 13:
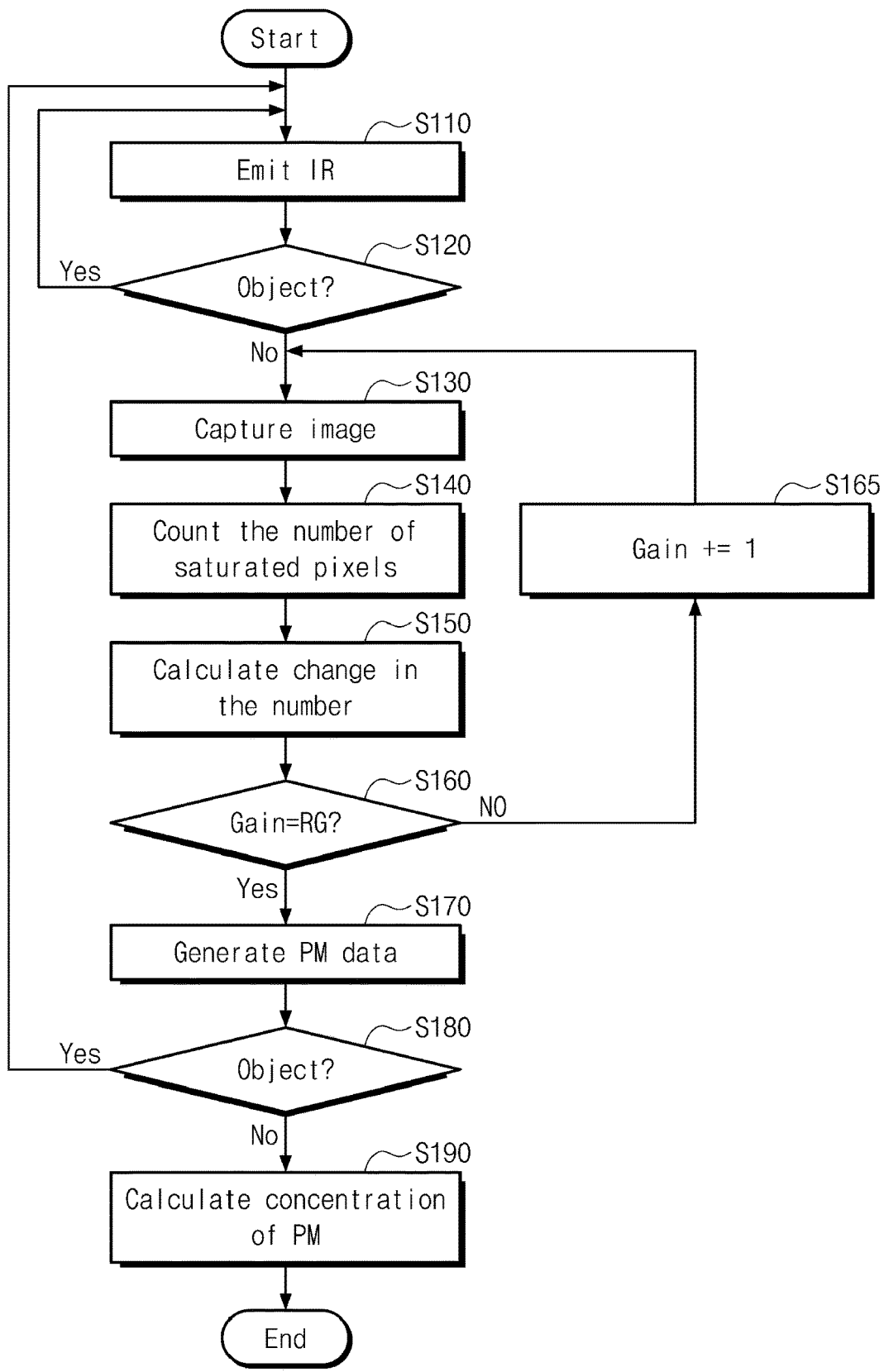
FIG. 13 is a flowchart describing an operating method of a system according to an exemplary embodiment.

FIG. 13 is a flowchart describing an operating method of a system 100 according to an exemplary embodiment. Operations of FIG. 13 may be performed in the system 100 of FIG. 1. Operations of FIG. 13 will be understood as a method of operation of the system 100 for measuring the particulate matter. For convenience of description, FIG. 13 will be described with reference to the reference numerals in FIG. 1.

Referring to FIG. 13, in operation S110, the light source 112 may output light of the infrared band. The output light may be scattered by the particulate matter. The scattered light may reach (or be incident on) the pixel array 121 of the sensor 120.

In operation S120, the system 100 may determine whether a condition for measuring the particulate matter is satisfied. For example, when the intensity of the scattered light or reflected light that is sensed in response to the output light is greater than a reference intensity, the processor 130 may determine that an object exists in front of the sensor 120. Here, the reference intensity may be understood as the intensity of the sensed light such that the object is determined to be adjacent to the sensor 120. When the particulate matter measurement is difficult due to the object, the system 100 may inform the user that the object exists through an output device (e.g., display or speaker). Thereafter, operation S110 may proceed. When the object is not sensed by the sensor 120, operation S130 is performed.

In operation S130, the sensor 120 may capture an image. The capturing of the image here will be understood as the operation of sensing the scattered light. Since the particulate matter may continuously move over time, the sensor 120 may generate images by the number of reference scan. The generated images may be merged into one image through the average operation. The sensor 120 may convert the analog signal generated from the pixel array 121 into the digital signal, based on a set gain value. The image herein may be the digital signal including the numeric values corresponding to the pixels PX, respectively.

In operation S140, the system 100 may count the number of saturated pixels. Operation S140 may be performed by the processor 130, but is not limited thereto. The number of saturated pixels may be understood as the number of numeric values greater than or equal to the threshold value in the digital signal (i.e., image). The system 100 may generate the count value corresponding to the set gain value.

In operation S150, the system 100 may calculate the variation in the counted number. Operation S150 may be performed by the processor 130, but is not limited thereto. For example, the system 100 may calculate the variation by subtracting the count value generated in the previous operation from the count value generated in the operation S140. The count value generated in the previous operation may be a count value corresponding to the gain value less than the gain value set in the operation S140.

In operation S160, the system 100 may determine whether the gain value is a reference gain value. The reference gain value may be a maximum value of gain values used for the particulate matter measurement. When a current gain value is not the reference gain value, operation S165 is performed. In operation S165, the gain value increases, and operations S130 to S150 may be performed based on the increased gain value. Operations S130 to S150 may be repeated until the gain value reaches the reference gain value. As a result, the count value and variation for a plurality of different gain values may be calculated.

In operation S170, the system 100 may generate the particulate matter data, based on the variation in the count value with respect to the gain value. Operation S170 may be performed by the processor 130, but is not limited thereto. The system 100 may calculate the amount of the particulate matter in the target size range by applying the correction factor to the variations corresponding to the gain values, respectively. Here, the particulate matter data is understood as a numeric value for the amount of the particulate matter before the conversion to the unit volume.

In operation S180, the system 100 may again determine whether the condition for measuring the particulate matter is satisfied, based on the particulate matter data. As described above with reference to operation S120, when the size of the particulate matter data is greater than the reference value, the processor 130 may determine that an object exists in front of the sensor 120. When the particulate matter measurement is difficult due to the object, the system 100 may inform the user that the object exists through the output device, and then operation S110 may proceed. When the object is not sensed from the sensor 120, operation S190 is performed.

In operation S190, the system 100 may calculate the particulate matter concentration by converting the particulate matter data into the unit volume. Operation S190 may be performed by the processor 130, but is not limited thereto. The particulate matter data is related to the amount of the particulate matter in the at least one target size range. When a plurality of sizes of the particulate matter are measured, the particulate matter data may include values for each of the plurality of sizes. The system 100 may calculate concentrations for each size of the particulate matter by converting each of these values into the unit volume.

Figure 14:
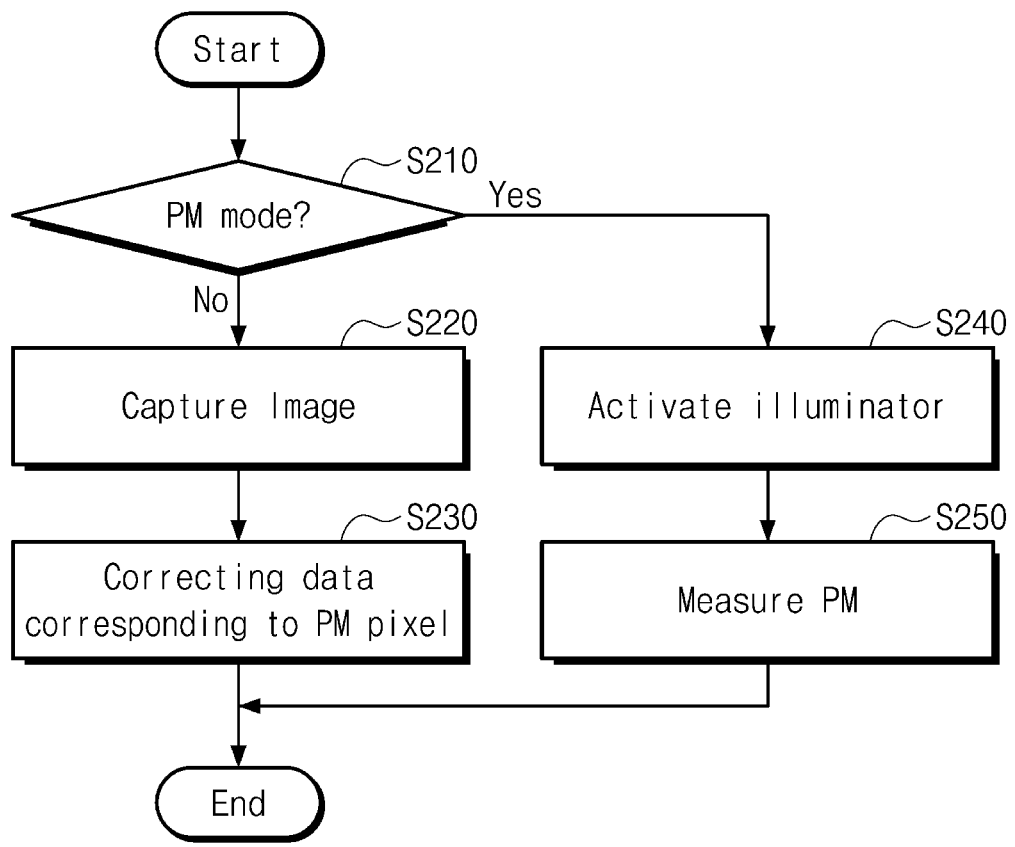
FIG. 14 is a flowchart describing a method of operating a system according to an exemplary embodiment.

FIG. 14 is a flowchart describing a method of operating a system 100 according to an exemplary embodiment. Operations of FIG. 14 may be performed by the system 100 of FIG. 1. Operations of FIG. 14 may be performed by a system 100 that includes pixels for sensing the visible light band and pixels for sensing the infrared band, such as the pixel array 121_2 of FIG. 4. Operations of FIG. 14 will be understood as a method of selectively performing the normal image capture and the particulate matter measurement. For convenience of description, FIG. 14 will be described with reference to the reference numerals of FIG. 1.

In operation S210, the processor 130 may determine the operation mode of the system 100. When the operation mode for the normal image capture is selected or determined, operations S220 and S230 are performed. When the operation mode for the particulate matter measurement is selected or determined, operations S240 and S250 are performed.

In operation S220, the sensor 120 may generate the image by sensing the light in the visible light band. In this case, among the plurality of pixels, color pixels sensing the light in the visible light band may generate the analog signal, based on the sensed light. The converting circuit 122 may convert the analog signal into the digital signal. In addition, pixels (PM pixel) that sense the light in the infrared band do not sense the light in the visible light band.

In operation S230, the system 100 may correct the image corresponding to the PM pixel. Operation S230 may be performed by the processor 130, but is not limited thereto. In one example, the system 100 may correct the data value corresponding to the PM pixel, based on a value corresponding to the color pixels adjacent to the PM pixel. The corrected value may be applied to the image generated in operation S220.

In operation S240, the system 100 may activate the illuminator 110. The illuminator 110 may output the light to be irradiated to the particulate matter such that the concentration of the particulate matter is measured. The output light may be scattered by the particulate matter. The scattered light may reach or be incident on the sensor 120.

In operation S250, the system 100 may measure particulate matter by sensing the scattered light. Operation for measuring the particulate matter may be the same as or similar to operations of FIG. 13.

Figure 15:
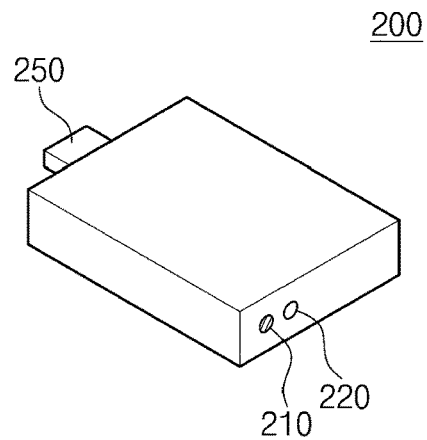
FIG. 15 is a diagram illustrating an electronic device to which a system according to an exemplary embodiment is applied.

FIG. 15 is a diagram illustrating an electronic device 200 to which a system 100 according to an exemplary embodiment (e.g., the system 100 of FIG. 1) is applied. Referring to FIG. 15, an electronic device 200 may include an illuminator 210, a sensor 220, and a connector 250. Further, the electronic device 200 may embed or include a configuration corresponding to the processor 130 of FIG. 1.

The illuminator 210 may correspond to the illuminator 110 of FIG. 1. The illuminator 210 may output light in the infrared band to the outside for the particulate matter measurement. The output light may be scattered by the particulate matter. The scattered light may be incident on the sensor 220.

The sensor 220 may generate an electrical signal for measuring the particulate matter, based on the scattered light. The sensor 220 may correspond to the sensor 120 of FIG. 1. The sensor 220 may be disposed adjacent to the illuminator 210 to receive the light scattered by the particulate matter. The sensor 220 may generate an analog signal corresponding to each of different gain values, and convert the analog signal into a digital signal.

The sensor 220 may include the pixel array 121_1 of FIG. 2. In this case, the electronic device 200 may be a dedicated device for measuring the particulate matter. It is understood, however, that one or more other exemplary embodiments are not limited thereto. For example, the sensor 220 may include the pixel array 121_2 of FIG. 4. In this case, the electronic device 200 may perform both the particulate matter measurement and the normal image capture.

The connector 250 may be provided to be electrically connected to an external electronic device. Through the connector 250, the electronic device 200 may communicate with an external device such as a computer device. A user may recognize a measurement result of the particulate matter through the external device.

The electronic device 200 may calculate the particulate matter concentration of the specific size range(s), based on the digital signal generated by the sensor 220. To this end, a configuration corresponding to the processor 130 of FIG. 1 may be provided to the electronic device 200. However, one or more other exemplary embodiments are not limited thereto, and the processor included in the electronic device 200 may control the operations of the illuminator 210 and the sensor 220, and the measurement of the particulate matter may be performed in the external device connected through the connector 250.

Figure 16:
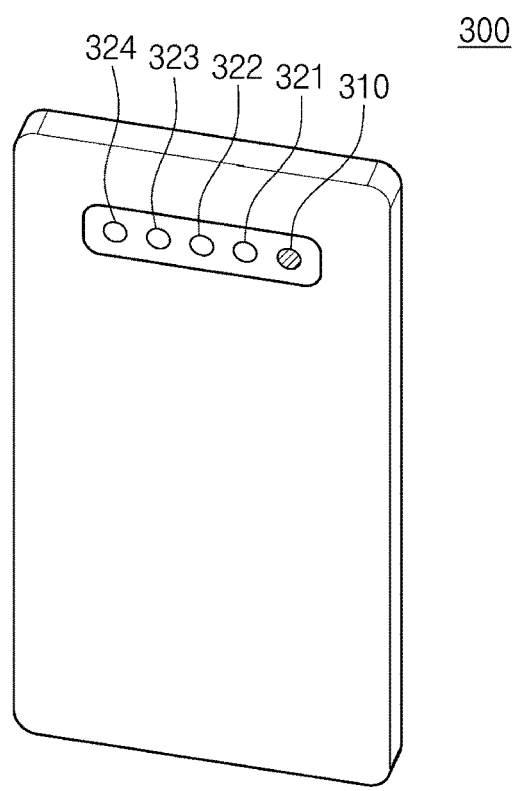
FIG. 16 is a diagram illustrating an electronic device to which a system according to an exemplary embodiment is applied.

FIG. 16 is an exemplary diagram illustrating an electronic device to which a system 100 (e.g., the system 100 of FIG. 1) according to another exemplary embodiment is applied. Referring to FIG. 16, an electronic device 300 may include an illuminator 310 and sensors 321, 322, 323, and 324. The electronic device 300 may include a component corresponding to the processor 130 of FIG. 1.

The illuminator 310 may correspond to the illuminator 110 of FIG. 1. The illuminator 310 may output light in the infrared band to the outside for the particulate matter measurement. The output light may be scattered by the particulate matter. The scattered light may be incident on at least one of the sensors 321, 322, 323, and 324.

The sensors 321, 322, 323, and 324 may receive external light and convert the received external light into an electrical signal such as an analog signal. In the sensors 321, 322, 323, and 324, at least one of a focal length, a viewing angle, a number of pixels, and a wavelength band of light to be sensed may be different from one another.

By way of example, the first sensor 321 may be an infrared sensor for sensing a depth, and may be a time of flight (TOF) sensor. The first sensor 321 may measure the depth of an object, based on the reflected light of the light output from the illuminator 310. Further, the second sensor 322 may be an ultra-wide angle image sensor having the widest viewing angle among the sensors 321, 322, 323, and 324 and having the smallest focal length. Additionally, the third sensor 323 may be a wide angle image sensor having a smaller viewing angle than the viewing angle of the second sensor 322 and having a larger focal length than the focal length of the second sensor 322. The fourth sensor 324 may be a telephoto image sensor. The second to fourth sensors 322, 323, and 324 may include pixels that sense light in the visible light band. It is understood that the above-described types and numbers of sensors 321, 322, 323, and 324 are exemplary. One or more other embodiments may have sensors of different types and characteristics from those described, and different numbers of sensors may be provided.

The sensor adjacent to the illuminator 310 may correspond to the sensor 120 of FIG. 1. For example, the first sensor 321 or the second sensor 322 may perform the operation for measuring the particulate matter. Further, the second sensor 322 may include the pixel array 121_2 of FIG. 4. In this case, the second sensor 322 may selectively perform the normal image capture operation and a scattered light sensing operation for measuring the particulate matter. For example, the first sensor 321 may selectively perform the operation for measuring the depth and the operation for measuring the particulate matter.

Figure 17:
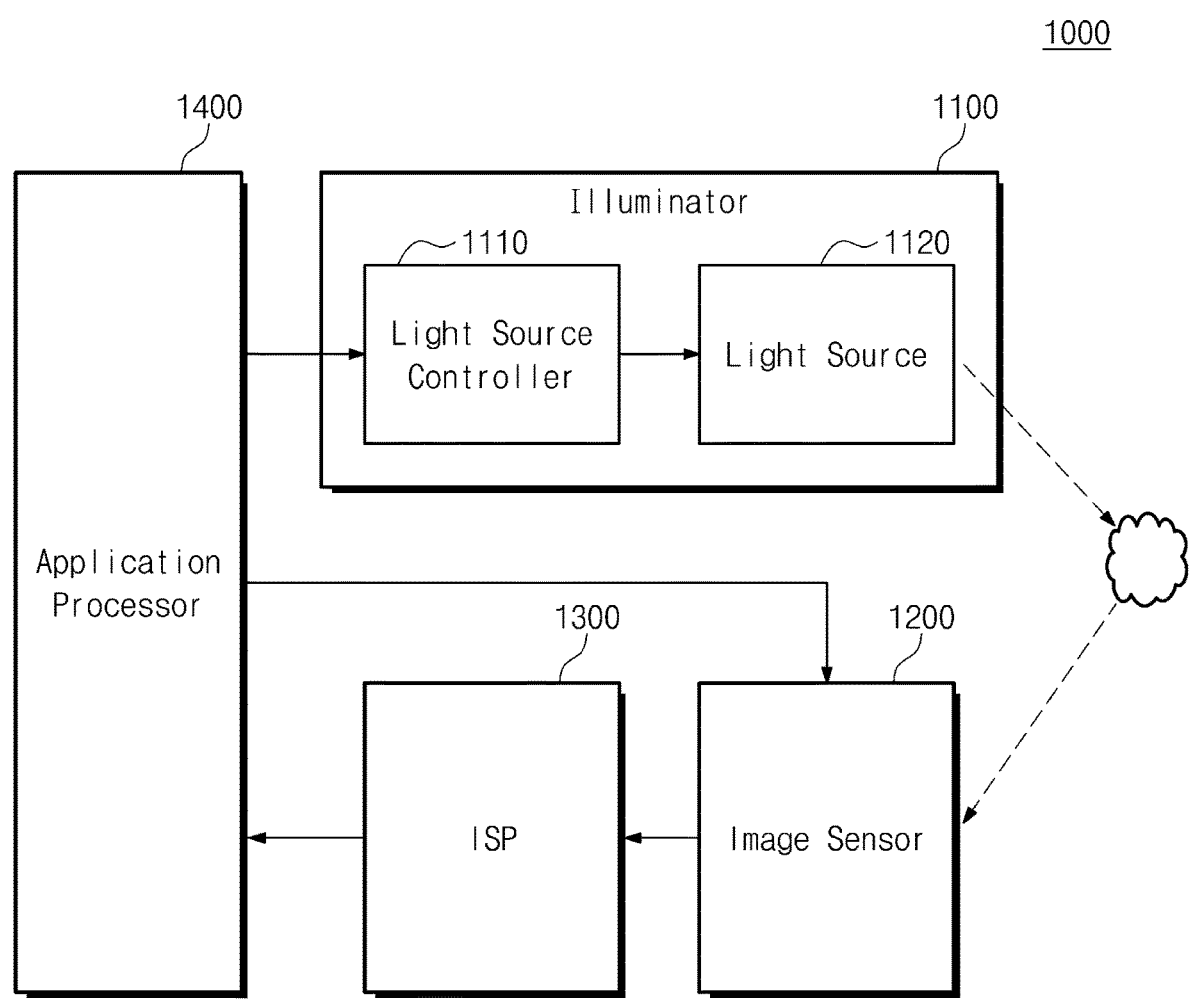
FIG. 17 is a block diagram of an image system according to an exemplary embodiment.

FIG. 17 is an exemplary block diagram of an image system 1000 according to an exemplary embodiment. Referring to FIG. 17, an image system 1000 may include an illuminator 1100, an image sensor 1200, an image signal processor 1300, and an application processor 1400. The image system 1000 may be variously implemented with a desktop computer, a laptop computer, a tablet computer, a smart phone, a wearable device, a head mounted device, a smart wearable device (e.g., smart glasses), a portable multimedia player, a digital camera device, etc.

The illuminator 1100 may output light of the infrared band to the outside. The illuminator 1100 may include a light source controller 1110 and a light source 1120. The light source controller 1110 and the light source 1120 may correspond to the light source controller 111 and the light source 112 of FIG. 1. The light output from the illuminator 1100 may be scattered by the particulate matter and incident on the image sensor 1200.

The image sensor 1200 may include the pixel array 121_2 as illustrated in FIG. 4. The image sensor 1200 may include the pixels sensing the light in the infrared band and the pixels sensing light in the visible light band. In the normal operation mode, the image sensor 1200 may sense the light in the visible light band and generate the digital image signal. In the particulate matter measurement mode, the image sensor 1200 may sense the scattered light of the light output from the light source 1120 and generate the digital signals respectively corresponding to different gain values.

The image signal processor 1300 may perform various image processing, based on the digital signal generated from the image sensor 1200. The image signal processor 1300 may process the digital image signal in the normal operation mode. For example, the image signal processor 1300 may perform various operations for improving image quality, such as correcting data values corresponding to pixels that sense the light in the infrared band. The image signal processor 1300 may calculate the concentration of particulate matter in a desired size range by analyzing the digital signals in the particulate matter measurement mode. This calculation process has been described above.

The application processor 1400 may control overall operations of the components of the image system 1000. The application processor 1400 may process various operations for operating the image system 1000. The application processor 1400 may determine the normal mode or the particulate matter measurement mode. In the normal mode, the application processor 1400 may deactivate the illuminator 1100 and provide a control signal for capturing the image of the image sensor 1200. In the particulate matter measurement mode, the application processor 1400 may activate the illuminator 1100 to output the light and control the gain value of the image sensor 1200.

According to exemplary embodiments, an electronic system and image system for measuring the particulate matter, and a method for measuring the particulate matter may measure a concentration of particulate matter for each size.

In addition, according to exemplary embodiments, a function of measuring the particulate matter may be fused to or combined with an image system for capturing an external image.

While not restricted thereto, an exemplary embodiment can be embodied at least in part as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

The contents described above are exemplary embodiments for implementing the inventive concept(s). The inventive concept(s) may include not only the exemplary embodiments described above but also exemplary embodiments in which a design is simply or easily capable of being changed. In addition, the inventive concept(s) may also include technologies easily changed to be implemented using exemplary embodiments. Therefore, the scope of the inventive concept(s) is not limited to the described exemplary embodiments but should be defined to at least include the claims and their equivalents.

What is claimed is:

1. An electronic system comprising:
an illuminator configured to output light;
a sensor comprising a pixel array configured to generate an analog signal based on scattered light according to the output light, and a converting circuit configured to convert the analog signal into digital signals respectively corresponding to gain values, based on the gain values; and
a processor configured to determine a number of values greater than or equal to a threshold value among values of the digital signals, and to determine a concentration of particulate matter having a target size range, based on a variation in the determined number according to a change of the gain values.

2. The electronic system of claim 1, wherein the converting circuit is configured to generate the digital signals by amplifying the analog signal while sequentially increasing a gain value from a smallest first gain value to a largest second gain value among the gain values.

3. The electronic system of claim 1, wherein:
the analog signal includes image signals respectively corresponding to the gain values, and each of the image signals includes frame signals of a reference scan number; and
the pixel array is configured to generate as many frame signals as the reference scan number for each of the gain values.

4. The electronic system of claim 3, wherein:
each of the digital signals includes digital frame signals corresponding to the frame signals, respectively; and
the sensor is configured to perform an average operation of the digital frame signals to generate, for each of the gain values, a corresponding digital signal.

5. The electronic system of claim 1, wherein the processor is configured to:
determine a first number of values greater than or equal to the threshold value in a first digital signal corresponding to a first gain value among the gain values;
determine a second number of values greater than or equal to the threshold value in a second digital signal corresponding to a second gain value greater than the first gain value among the gain values; and
determine the variation corresponding to the second gain value by subtracting the first number from the second number.

6. The electronic system of claim 1, wherein the processor is configured to:
determine the number of values greater than or equal to the threshold value for each of the digital signals to generate count values respectively corresponding to the gain values;
determine differential values of the count values according to the change of the gain values; and
determine the concentration of the particulate matter corresponding to the target size range by multiplying the differential values by a correction factor corresponding to the target size range.

7. The electronic system of claim 1, wherein:
the target size range includes a first range and a second range; and
the processor is configured to determine a first concentration of the particulate matter corresponding to the first range and a second concentration of the particulate matter corresponding to the second range, based on the variation.

8. The electronic system of claim 7, wherein the first range corresponds to PM 10 and the second range corresponds to the PM 2.5.

9. An image system comprising:
a pixel array comprising:
first pixels configured to generate a first analog signal based on scattered light corresponding to light of a first wavelength band output from a light source, and
second pixels configured to generate a second analog signal based on light of a second wavelength band less than the first wavelength band;
a converting circuit configured to convert the first analog signal into first digital signals respectively corresponding to gain values, and to convert the second analog signal into a second digital signal; and
a processor configured to determine a concentration of particulate matter in a region where the light is output, based on a number of values, of each of the first digital signals, greater than or equal to a threshold value and a variation of the number.

10. The image system of claim 9, wherein the first wavelength band is at least a portion of an infrared band, and the second wavelength band is at least a portion of a visible light band.

11. The image system of claim 9, further comprising:
a filter configured to pass the light of the first wavelength band and the light of the second wavelength band and to block light of a third wavelength band between the first wavelength band and the second wavelength band,
wherein the pixel array is configured to receive the scattered light or the light of the second wavelength band through the filter.

12. The image system of claim 9, wherein a number of the first pixels is less than a number of the second pixels, and at least four second pixels are disposed between two first pixels.

13. The image system of claim 9, wherein:
each of the first pixels includes a first pixel region for receiving the light of the first wavelength band, and a transparent member disposed on the first pixel region;
each of the second pixels includes a second pixel region for receiving the light of the second wavelength band, and a color filter disposed on the second pixel region and configured to pass light in a partial band of the second wavelength band; and
a thickness of the transparent member is same as a thickness of the color filter.

14. The image system of claim 9, wherein the processor is configured to:
determine the number of values greater than or equal to the threshold value among values of the first digital signals;
determine a variation of the counted number with respect to the gain values; and
determine the concentration of the particulate matter in a target size range, based on the variation.

15. The image system of claim 9, wherein:
a target size range includes a first range and a second range, and
wherein the processor is configured to determine a first concentration of a first particulate matter having a size within the first range by multiplying the variation by a first correction factor, and a second concentration of a second particulate matter having a size within the second range by multiplying the variation by a second correction factor.

16. The image system of claim 9, wherein the processor is configured to:
activate the light source in a first mode, and control the converting circuit to generate the first digital signals in the first mode; and
deactivate the light source in a second mode, and control the converting circuit to generate the second digital signals in the second mode.

17. The image system of claim 9, wherein the processor is configured to compensate values corresponding to the first pixels, based on the second digital signal.

18. A method for measuring particulate matter, the method comprising:
generating an analog signal by sensing scattered light according to an output of light;
converting the analog signal into digital signals respectively corresponding to gain values, based on the gain values;
determining a number of values greater than or equal to a threshold value among values of the digital signals; and
determining a concentration of particulate matter corresponding to at least one target size range, based on the determined number.

19. The method of claim 18, wherein the determining the concentration of particulate matter comprises:
determining a differential value of the counted number corresponding to each of the gain values, based on the counted number; and
obtaining data of the particulate matter corresponding to the at least one target size range by multiplying the differential value by a correction factor.

20. The method of claim 18, wherein:
the light has a wavelength in an infrared band;
the generating the analog signal comprises converting the scattered light into the analog signal by first pixels, of a pixel array, that sense light in the infrared band; and
the pixel array further includes second pixels for sensing light in a visible light band.

* * * * *